US008195375B2

(12) United States Patent
Chen et al.

(10) Patent No.: US 8,195,375 B2
(45) Date of Patent: Jun. 5, 2012

(54) METHOD FOR CONTROLLING COMBUSTION MODE TRANSITIONS IN AN INTERNAL COMBUSTION ENGINE

(75) Inventors: Jyh-Shin Chen, Troy, MI (US); Chen-Fang Chang, Troy, MI (US); Jun-Mo Kang, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 602 days.

(21) Appl. No.: 12/185,185

(22) Filed: Aug. 4, 2008

(65) Prior Publication Data

US 2009/0048760 A1 Feb. 19, 2009

Related U.S. Application Data

(60) Provisional application No. 60/956,411, filed on Aug. 17, 2007.

(51) Int. Cl.

| | |
|---|---|
| ***B60T 7/12*** | (2006.01) |
| ***G05D 1/00*** | (2006.01) |
| ***G06F 7/00*** | (2006.01) |
| ***G06F 17/00*** | (2006.01) |
| ***F01L 1/34*** | (2006.01) |
| ***F02B 17/00*** | (2006.01) |

(52) U.S. Cl. ...................... 701/103; 123/295; 123/90.15

(58) Field of Classification Search .................. 701/103, 701/104; 123/90.15, 295, 305, 430

See application file for complete search history.

(56) References Cited

U.S. PATENT DOCUMENTS

| | | | | |
|---|---|---|---|---|
| 6,336,436 | B1 * | 1/2002 | Miyakubo et al. | 123/295 |
| 6,910,449 | B2 * | 6/2005 | Strom et al. | 123/90.16 |
| 7,213,566 | B1 * | 5/2007 | Jankovic et al. | 123/302 |
| 2006/0150952 | A1 * | 7/2006 | Yang et al. | 123/432 |
| 2006/0196466 | A1 * | 9/2006 | Kuo et al. | 123/295 |
| 2007/0205029 | A1 * | 9/2007 | Leone et al. | 180/65.2 |
| 2008/0035125 | A1 * | 2/2008 | Jankovic | 123/556 |
| 2008/0066713 | A1 * | 3/2008 | Megli et al. | 123/295 |
| 2010/0242902 | A1 * | 9/2010 | Kang et al. | 123/305 |

* cited by examiner

*Primary Examiner* — Willis Wolfe, Jr.
*Assistant Examiner* — Anthony L Bacon

(57) ABSTRACT

An internal combustion engine is selectively operative in one of a plurality of combustion modes. A method for controlling the engine includes commanding the engine operation to transition from a first combustion mode to a second combustion mode. Engine valve operation is commanded to a desired valve overlap and valve overlap is monitored. Engine operation is changed to the second combustion mode when the engine valve overlap achieves a predetermined range or threshold.

16 Claims, 3 Drawing Sheets

METHOD FOR CONTROLLING COMBUSTION MODE TRANSITIONS IN AN INTERNAL COMBUSTION ENGINE

CROSS REFERENCE TO RELATED APPLICATIONS

This application claims the benefit of U.S. Provisional Application No. 60/956,411 filed on Aug. 17, 2007 which is hereby incorporated herein by reference.

TECHNICAL FIELD

This disclosure relates to controlling operation of internal combustion engines.

BACKGROUND

The statements in this section merely provide background information related to the present disclosure and may not constitute prior art.

Known spark-ignition (hereafter 'SI') engines introduce an air/fuel mixture into each cylinder which is compressed in a compression stroke and ignited by a spark plug. Known compression ignition engines inject pressurized fuel into a combustion cylinder near top dead center (hereafter 'TDC') of the compression stroke which ignites upon injection. Combustion for both gasoline engines and diesel engines involves premixed or diffusion flames controlled by fluid mechanics.

Gasoline engines can operate in a variety of different combustion modes, including a homogeneous SI (hereafter 'SI-H') combustion mode, a stratified-charge SI (hereafter 'SI-SC') combustion mode, or a homogeneous-charge-compression-ignition (hereafter 'HCCI'). In a SI-H combustion mode, the cylinder charge is homogeneous in composition, temperature, and residual exhaust gases at timing of spark ignition. Fuel mass is uniformly distributed around the cylinder chamber at spark timing which occurs near the end of the compression stroke. The air/fuel ratio is preferably stoichiometric. In a SI-SC combustion mode, the air/fuel ratio can be lean of stoichiometry. The fuel mass is stratified in the cylinder chamber with rich layers around the spark plug and leaner air/fuel areas further out. Fuel timing can be close to spark timing to prevent the air/fuel mixture from homogenizing into a uniformly disbursed mixture. The fuel pulse width can end as the spark event begins or substantially prior. Upon ignition, the rich layers burn quick and efficiently. As the combustion process proceeds into the leaner areas, the flame-front cools rapidly resulting in lower NOx emissions.

Gasoline engines can be adapted to operate in a HCCI combustion mode, also referred to as controlled auto-ignition combustion, under predetermined speed/load operating conditions. The controlled auto-ignition combustion comprises a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. Controlled auto-ignition combustion is a distributed kinetically-controlled combustion process with the engine operating at a dilute air/fuel mixture, i.e., lean of an air/fuel stoichiometric point, with relatively low peak combustion temperatures, resulting in low NOx emissions. The homogeneous air/fuel mixture minimizes occurrences of rich zones that form smoke and particulate emissions.

In an engine configured for multiple combustion modes, switching between the different combustion modes can be advantageous. Different combustion modes in similar speed/load situations can have performance differences in engine stability, emissions, and fuel economy. Transitioning to a particular mode with the best performance in a particular situation is therefore preferable. Selecting a combustion mode in which to operate can be based upon which combustion mode performs better at a particular engine load and speed. When a change in speed and/or engine load warrants the switch to a different combustion mode, a transition strategy will be performed and the engine will transition to the different combustion mode.

As the number of combustion modes increases, transitioning between combustion modes and coordinating transitions can be complex. The engine control module must be capable of operating the engine in multiple combustion modes and switching among them seamlessly. Without a switching strategy a significant transient response may occur resulting in incomplete combustion and misfires, leading to torque disturbances and/or undesirable emissions.

SUMMARY

An internal combustion engine is selectively operative in one of a plurality of combustion modes. A method for controlling the engine includes commanding the engine operation to transition from a first combustion mode to a second combustion mode. Engine valve operation is commanded to a desired valve overlap and valve overlap is monitored. Engine operation is changed to the second combustion mode only when the engine valve overlap achieves a predetermined range or threshold.

BRIEF DESCRIPTION OF THE DRAWINGS

One or more embodiments will now be described, by way of example, with reference to the accompanying drawings, in which.

DETAILED DESCRIPTION

Figure 1:
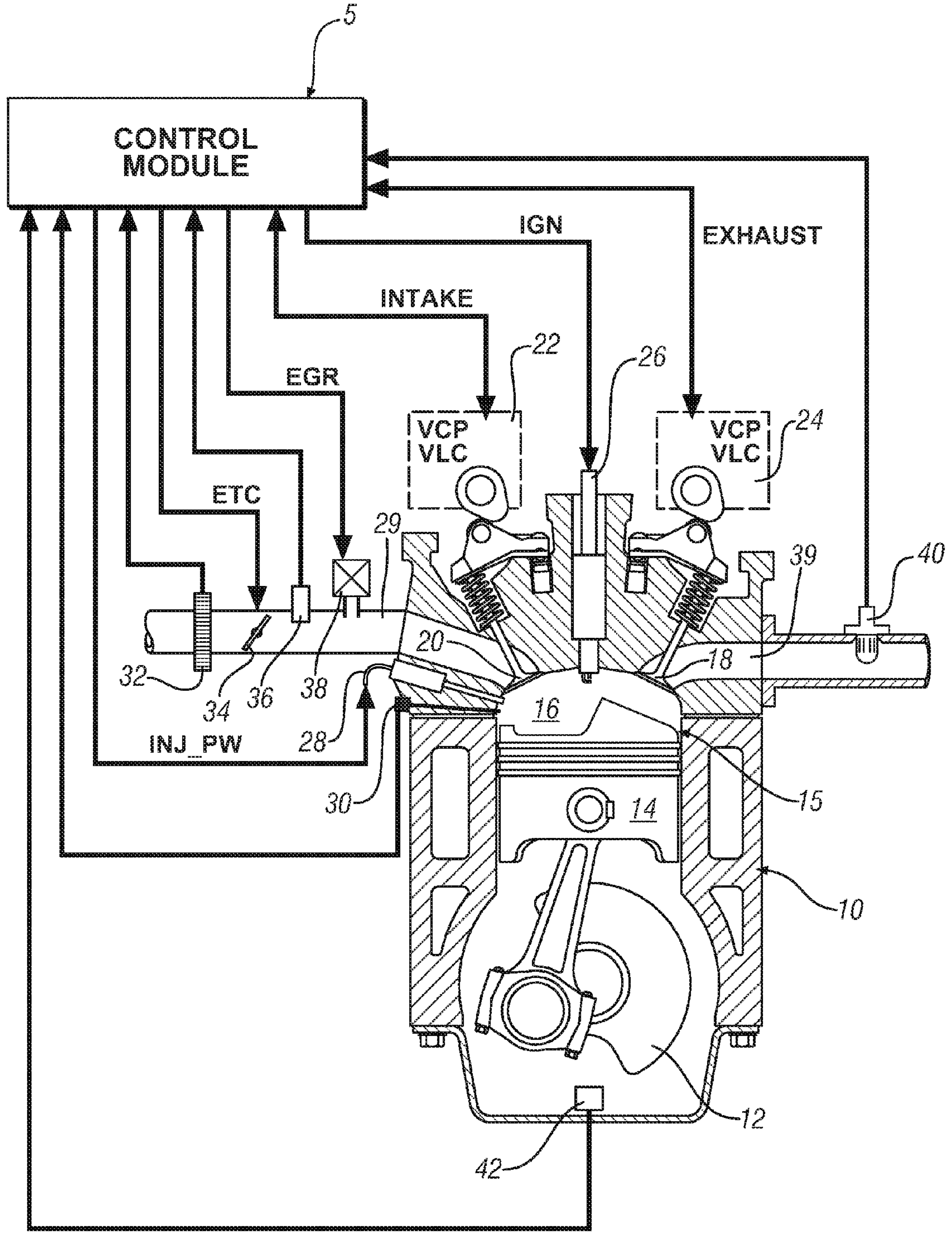
FIG. 1 is a schematic drawing of an exemplary engine system, in accordance with the present disclosure.

Referring now to the drawings, wherein the depictions are for the purpose of illustrating certain exemplary embodiments only and not for the purpose of limiting the same, FIG. 1 schematically shows an internal combustion engine 10 and accompanying control module 5. The engine 10 is selectively operative in a controlled auto-ignition combustion mode, a homogeneous spark-ignition combustion mode, and a stratified-charge spark-ignition combustion mode.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which their linear reciprocating motion is translated to rotational motion. An air intake system provides intake air to an intake manifold 29 which directs and distributes air into an intake runner to each combustion chamber 16. The air intake system comprises airflow ductwork and devices for monitoring and controlling the air flow. The air intake devices preferably include a mass airflow sensor 32 for monitoring mass airflow and intake air temperature. A throttle valve 34 preferably comprises an electronically controlled device which controls air flow to the engine 10 in response to a control signal ('ETC') from the control module 5. A pressure sensor 36 in the manifold is adapted to monitor manifold absolute pressure and barometric pressure. An external flow passage recirculates exhaust gases from engine exhaust to the intake manifold, having a flow control valve, referred to as an exhaust gas recirculation ('EGR') valve 38. The control module 5 is operative to control mass flow of exhaust gas to the intake manifold 29 by controlling opening of the EGR valve 38.

Air flow from the intake manifold 29 into each of the combustion chambers 16 is controlled by one or more intake valves 20. Flow of combusted gases from each of the combustion chambers 16 to an exhaust manifold 39 is controlled by one or more exhaust valves 18. Openings and closings of the intake and exhaust valves 20 and 18 are preferably controlled with a dual camshaft (as depicted), the rotations of which are linked and indexed with rotation of the crankshaft 12. The engine 10 is equipped with devices for controlling valve lift of the intake valves and the exhaust valves, referred to as variable lift control (hereafter 'VLC') devices. The variable lift control devices in this embodiment are operative to control valve lift, or opening, to one of two distinct steps, e.g., a low-lift valve opening (about 4-6 mm) for low speed, low load engine operation, and a high-lift valve opening (about 8-10 mm) for high speed, high load engine operation. The engine is further equipped with devices for controlling phasing (i.e., relative timing) of opening and closing of the intake and exhaust valves 20 and 18, referred to as variable cam phasing ('VCP'), to control phasing beyond that which is effected by the two-step VLC lift. There is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5, for example through camshaft rotation position sensors for the intake camshaft and the exhaust camshaft. When the engine 10 is operating in the HCCI combustion mode with an exhaust recompression valve strategy, the VCP/VLC systems 22 and 24 are preferably controlled to the low lift valve openings. When the engine is operating in the homogeneous spark-ignition combustion mode, the VCP/VLC systems 22 and 24 are preferably controlled to the high lift valve openings to minimize pumping losses. When operating in the HCCI combustion mode, low lift valve openings and negative valve overlap can be commanded to generate reformates in the combustion chamber 16. There can be a time lag between a command to change cam phasing and/or valve lift of one of the VCP/VLC systems 22 and 24 and execution of the transition due to physical and mechanical properties of the systems.

The intake and exhaust VCP/VLC systems 22 and 24 have limited ranges of authority over which opening and closing of the intake and exhaust valves 18 and 20 can be controlled. VCP systems can have a range of phasing authority of about 60°-90° of cam shaft rotation, thus permitting the control module 5 to advance or retard valve opening and closing. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5. Valve overlap of the intake and exhaust valves 20 and 18 refers to a period defining closing of the exhaust valve 18 relative to an opening of the intake valve 20 for a cylinder. The valve overlap can be measured in crank angle degrees, wherein a positive valve overlap (hereafter 'PVO') refers to a period wherein both the exhaust valve 18 and the intake valve 20 are open and a negative valve overlap (hereafter 'NVO') refers to a period between closing of the exhaust valve 18 and subsequent opening of the intake valve 20 wherein both the intake valve 20 and the exhaust valve 18 are closed. When operating in the HCCI combustion mode and the SI-SG combustion mode, the intake and exhaust valves may have a NVO as part of an exhaust recompression strategy. In an SI-H combustion mode there is a PVO.

The engine 10 includes a fuel injection system, comprising a plurality of high-pressure fuel injectors 28 each adapted to directly inject a mass of fuel into one of the combustion chambers 16, in response to a signal ('INJ_PW') from the control module 5. The fuel injectors 28 are supplied pressurized fuel from a fuel distribution system.

The engine 10 includes a spark-ignition system by which spark energy is provided to a spark plug 26 for igniting or assisting in igniting cylinder charges in each of the combustion chambers 16 in response to a signal ('IGN') from the control module 5. The spark plug 26 enhances the ignition timing control of the engine at certain conditions (e.g., during cold start and near a low load operation limit).

The engine 10 is equipped with various sensing devices for monitoring engine operation, including monitoring crankshaft rotational position, i.e., crank angle and speed. Sensing devices include a crankshaft rotational speed sensor ('crank sensor') 42, a combustion sensor 30 adapted to monitor combustion and an exhaust gas sensor 40 adapted to monitor exhaust gases, preferably a wide range air/fuel ratio sensor in this embodiment. The combustion sensor 30 comprises a sensor device operative to monitor a state of a combustion parameter and is depicted as a cylinder pressure sensor operative to monitor in-cylinder combustion pressure. The outputs of the combustion sensor 30, the exhaust gas sensor 40 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure ('IMEP') for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The engine 10 is designed to operate un-throttled on gasoline or similar fuel blends in the controlled auto-ignition combustion mode over an extended area of engine speeds and loads. However, spark-ignition and throttle-controlled operation may be utilized under conditions not conducive to the controlled auto-ignition combustion mode and to obtain maximum engine power to meet an operator torque request with engine power defined by the engine speed and load. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used.

The control module 5 executes algorithmic code stored therein to control the aforementioned actuators to control engine operation, including throttle position, spark timing, fuel injection mass and timing, intake and/or exhaust valve timing and phasing, and EGR valve position to control flow of recirculated exhaust gases. Valve timing and phasing can include predetermined valve overlap, including NVO and low lift of the intake and exhaust valves 20 and 18 in an exhaust re-breathing strategy. The control module 5 is adapted to receive input signals from an operator, e.g., from a throttle pedal position and a brake pedal position, to determine an operator torque request, and from the sensors indicating the engine speed, intake air temperature, coolant temperature, and other ambient conditions.

The control module 5 is preferably a general-purpose digital computer generally comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The control module has a set of control algorithms, comprising resident program instructions and calibrations stored in the non-volatile memory. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
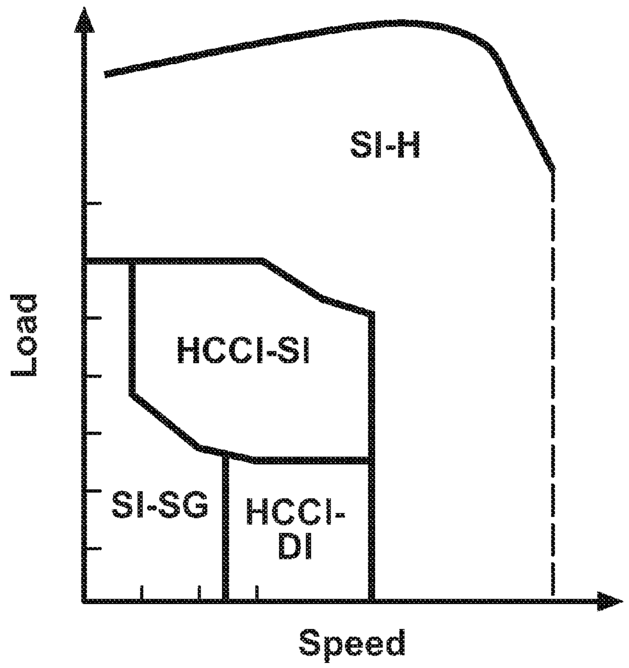
FIGS. 2 and 3 are data graphs, in accordance with the present disclosure.

FIG. 2 schematically depicts preferred operating areas for the exemplary engine 10 in spark-ignition and controlled auto-ignition combustion modes, based upon states of engine parameters—in this embodiment comprising speed and load which is derivable from engine parameters including the fuel flow and the intake manifold pressure. The engine combustion modes preferably comprise a spray-guided spark-ignition ('SI-SG') combustion mode, a single injection controlled auto-ignition ('HCCI-SI') combustion mode, and double injection controlled auto-ignition ('HCCI-DI') combustion mode, and a homogeneous spark-ignition ('SI-H') combustion mode. A preferred speed and load operating area for each of the combustion modes is based upon engine operating parameters, including combustion stability, fuel consumption, emissions, engine torque output, and others. Boundaries which define the preferred speed and load operating areas to delineate operation in the aforementioned combustion modes are preferably precalibrated and stored in the control module 5.

The engine 10 is controlled to operate at a preferred air-fuel ratio and the intake air flow is controlled to achieve the preferred air-fuel ratio. This includes estimating a cylinder air charge based upon engine operation in the selected combustion mode. The throttle valve 34 and VCP/VLC devices 22 and 24 are controlled to achieve an intake air flowrate based upon the estimated cylinder air charge, including during a transition between the spark-ignition and controlled auto-ignition combustion modes. Air flow is controlled by adjusting the throttle valve 34 and the VCP/VLC devices 22 and 24 to control the opening timing and profiles of the intake and exhaust valve(s) 20 and 18. Operation in the two combustion modes requires different settings for the VCP/VLC devices 22 and 24 in terms of valve timing and profiles of the intake and exhaust valve(s) 20 and 18 and the throttle valve 34 for throttle position. By way of example, the throttle valve 34 is preferably wide-open in the auto-ignition combustion mode with the engine 10 controlled at a lean air-fuel ratio, whereas the throttle valve 34 is controlled to regulate the air flow and the engine 10 is controlled to a stoichiometric air-fuel ratio in the spark-ignition combustion mode.

Figure 3:
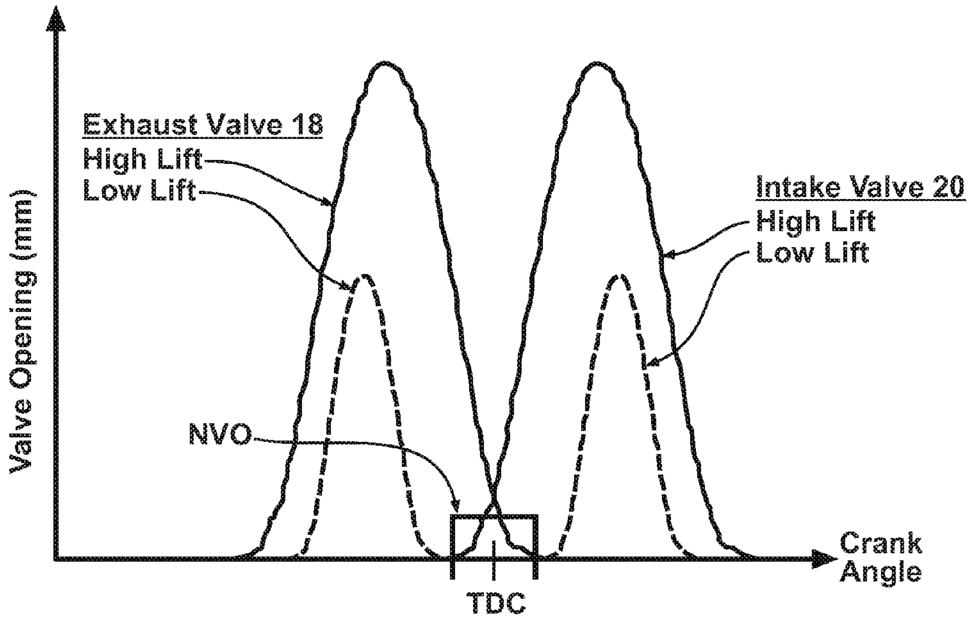

FIG. 3 shows openings and closings of the intake and exhaust valves 20 and 18 with respect to the engine crank angle during the exhaust and intake combustion phases in different combustion modes, depicted with reference to the exemplary engine 10 described in FIG. 1. During the SI-H combustion mode, the intake and exhaust VCP/VLC devices 22 and 24 are controlled to high lift valve openings, while during the HCCI combustion modes and the SI-SG combustion mode the intake and exhaust VCP/VLC devices 22 and 24 are controlled to low lift valve openings. In the HCCI combustion mode, the opening timing of the intake valve(s) 20 is preferably symmetrical to the closing timing of the exhaust valve(s) 18 relative to TDC for each cylinder 15. Both the cylinder charge composition and temperature are affected by the exhaust valve 18 closing timing. In particular, more hot residual gas from a previous cycle can be retained with earlier closing of the exhaust valve 20, leaving less cylinder volume available for incoming fresh air mass. This results in higher cylinder charge temperature and lower cylinder oxygen concentration. In an exhaust recompression strategy used during the HCCI combustion mode, the VCP/VLC devices 22 and 24 effect a negative valve overlap of the exhaust valve 18 and the intake valve 20. Further, in an HCCI engine using exhaust recompression valve strategy, the cylinder charge temperature can be controlled by trapping different masses of residual gases from the previous cycle by varying the exhaust valve close timing. The SI-SG combustion mode can use either positive or negative valve overlap.

Figure 4A:
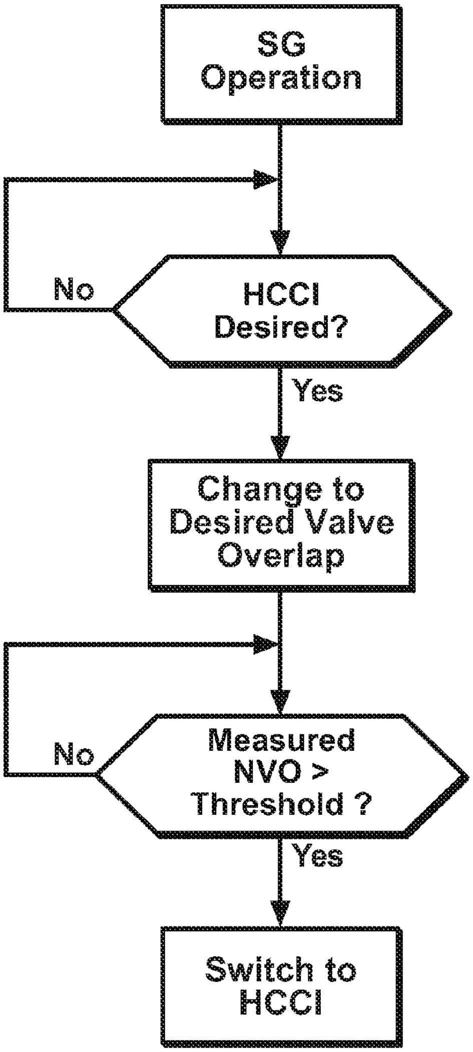
FIGS. 4A and 4B are schematic block diagrams of a control scheme in accordance with the present disclosure.
Figure 4B:
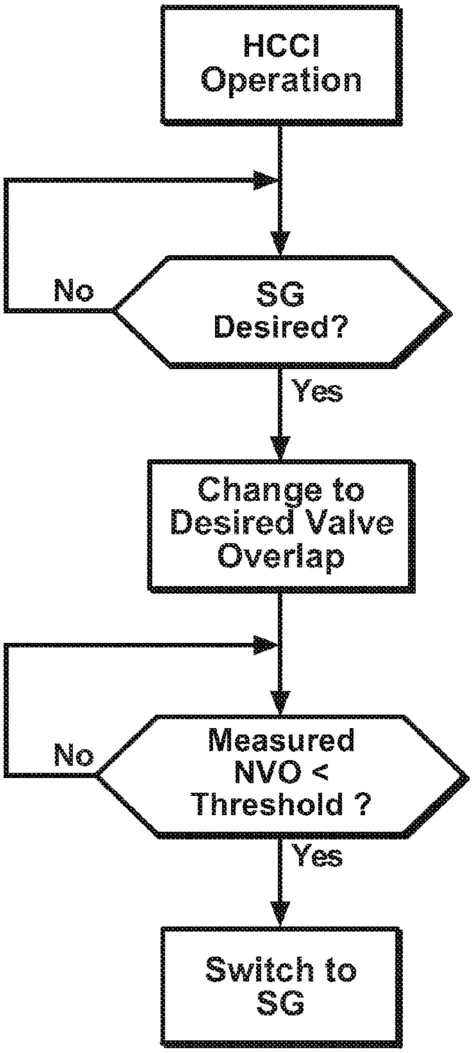

FIGS. 4A and 4B depict flowcharts for controlling transitions between the SI-SG (SG) combustion mode and HCCI combustion mode. FIG. 4A shows a transition from the SI-SG combustion mode to the HCCI combustion mode. As described above, the control module 5 monitors engine operating points including engine speed and engine load to determine whether to command a combustion mode transition. During engine operation in the SI-SG combustion mode, the control module 5 determines whether to transition to the HCCI combustion mode. A transition from the SI-SG combustion mode to the HCCI combustion mode comprises the control module 5 commanding the VCP/VLC devices 22 and 24 to change to a predetermined desired valve overlap. The control module 5 monitors the valve openings and closings of the intake and exhaust valves 20 and 18 and calculates and commands transitioning to a preferred valve overlap for operating in the HCCI combustion mode, which is a negative valve overlap in this embodiment. The measured negative valve overlap is compared to a threshold overlap value. When the measured negative valve overlap is greater than the threshold value, indicating that the period between exhaust valve closing and intake valve opening is increasing, the control module 5 commands engine operation in the HCCI mode, including controlling fuel injection mass and timing. This operation maintains combustion stability during the transition to HCCI mode, as combustion in the SI-SG mode can be more stable over the range of negative valve overlap at which HCCI combustion can be commanded. For purposes of this embodiment, the state of the valve overlap is measured in crank angle degrees.

FIG. 4B shows a transition from the HCCI combustion mode to the SI-SG combustion mode. As described above, the control module 5 monitors engine operating points including engine speed and engine load to determine whether to command a combustion mode transition. During engine operation in the HCCI combustion mode, the control module 5 determines whether to transition to the SI-SG combustion mode. A transition to the SI-SG combustion mode from the HCCI combustion mode comprises the control module commanding the VCP/VLC devices 22 and 24 to change to a predetermined desired valve overlap. The control module 5 monitors the valve openings of the intake and exhaust valves 20 and 18 and calculates and commands transitioning to a preferred valve overlap for operating in the SI-SG combustion mode. A threshold valve overlap, which can comprise a negative valve overlap, is determined. The threshold valve overlap comprises a negative valve overlap at which the engine can operate in the SI-SG mode. The measured negative valve overlap is compared to the threshold overlap value. When the measured negative valve overlap achieves or is less than the threshold value, the control module 5 commands engine operation in the SI-SG mode. This operation maintains combustion stability during the transition to the SI-SG mode, as combustion in the SI-SG mode can be more stable over the range of negative valve overlap.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling an internal combustion engine including a controllable throttle control device and controllable engine valves, the engine selectively operative in first and second combustion modes, the method comprising:
- commanding engine operation to transition from the first combustion mode to the second combustion mode;
- operating the engine in the first combustion mode and commanding the engine valves to transition to a desired valve overlap for operating in the second combustion mode, the desired valve overlap within a predetermined range, wherein the predetermined range comprises a negative valve overlap compatible with engine operation in either the first or second combustion modes;
- monitoring the valve overlap of the engine valves; and
- operating the engine in the second combustion mode when the valve overlap of the engine valves during the transition to the desired valve overlap achieves a predetermined threshold of valve overlap within the predetermined range.

2. The method of claim 1, wherein operating the engine in the second combustion mode includes controlling timing of fuel injection to effect operation in the second combustion mode.

3. The method of claim 1, wherein the first combustion mode comprises a spark-ignition combustion mode and the second combustion mode comprises an auto-ignition combustion mode.

4. The method of claim 3, wherein the predetermined threshold is a minimum negative valve overlap threshold.

5. The method of claim 1, wherein the first combustion mode comprises an auto-ignition combustion mode and the second combustion mode comprises a spark-ignition combustion mode.

6. The method of claim 5 wherein the predetermined threshold is a maximum negative valve overlap threshold.

7. A method for controlling an internal combustion engine including a controllable throttle control device and controllable engine valves, the engine selectively operative in a spark ignition combustion mode and an auto-ignition combustion mode, the method comprising:
- commanding engine operation to transition from a first of the combustion modes to the second combustion mode;
- operating the engine in the first combustion mode and commanding phasing of the engine valves to transition to a desired valve overlap compatible with operating in the second combustion mode, the desired valve overlap within a predetermined range, wherein the predetermined range comprises a negative valve overlap compatible with engine operation in either the first or second combustion modes;
- monitoring the valve overlap of the engine valves; and
- transitioning engine operation to the second combustion mode when the valve overlap of the engine valves during the transition to the desired valve overlap achieves a predetermined threshold of valve overlap within the predetermined range.

8. The method of claim 7, wherein transitioning engine operation to the second combustion mode includes controlling timing of fuel injection to effect operation in the second combustion mode.

9. The method of claim 7, wherein the first combustion mode is the spark-ignition combustion mode and the second combustion mode is the auto-ignition combustion mode.

10. The method of claim 9, further comprising:
- transitioning to the auto-ignition combustion mode; and
- controlling the phasings of the engine valves based upon the desired valve overlap for operating in the auto-ignition mode.

11. The method of claim 7, wherein the first combustion mode is the auto-ignition combustion mode and wherein the second combustion mode is the spark-ignition combustion mode.

12. The method of claim 11, further comprising:
- transitioning to the spark-ignition combustion mode; and
- controlling the phasings of the engine valves based upon the desired valve overlap for operating in the spark-ignition combustion mode.

13. A method for combustion mode transitions in an internal combustion engine having controllable engine valves, the engine configured for selective operation in first and second combustion modes, the method comprising:
- operating the engine in the first combustion mode;
- controlling the engine valves to transition to a desired valve overlap compatible with operating the engine in the second combustion mode, the desired valve overlap within a predetermined range, wherein the predetermined range comprises a negative valve overlap compatible with engine operation in either the first or second combustion modes;
- monitoring the valve overlap of the engine valves; and
- when the valve overlap of the engine valves during the transition to the desired valve overlap achieves a predetermined threshold of valve overlap within the predetermined range, operating the engine in the second combustion mode.

14. The method of claim 13 wherein the first combustion mode is a spark-ignition combustion mode, the second combustion mode is an auto-ignition combustion mode, and controlling the engine valves to a desired valve overlap compatible with the second combustion mode includes increasing a negative valve overlap.

15. The method of claim 13 wherein the first combustion mode is an auto-ignition combustion mode, the second combustion mode is a spark-ignition combustion mode, and controlling the engine valves to a desired valve overlap compatible with the second combustion mode includes decreasing a negative valve overlap.

16. The method of claim 13 wherein, during controlling the engine valves to a desired valve overlap compatible with the second combustion mode, further controlling the engine valves to low lift valve openings.

* * * * *